(12) United States Patent
Tsai et al.

(10) Patent No.: US 9,898,275 B2
(45) Date of Patent: Feb. 20, 2018

(54) CONNECTOR AND MANUFACTURING METHOD AND UPDATING METHOD OF THE SAME

(71) Applicant: Nuvoton Technology Corporation, Hsinchu (TW)

(72) Inventors: Hsi-Jung Tsai, Hsinchu (TW); Ping-Ying Chu, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 0 days.

(21) Appl. No.: 15/076,636

(22) Filed: Mar. 21, 2016

(65) Prior Publication Data

US 2017/0005441 A1  Jan. 5, 2017

(30) Foreign Application Priority Data

Jul. 3, 2015  (TW) .............................. 104121690 A

(51) Int. Cl.
G06F 9/445 (2006.01)
H01R 29/00 (2006.01)
G06F 9/44 (2006.01)

(52) U.S. Cl.
CPC .............. *G06F 8/65* (2013.01); *H01R 29/00* (2013.01)

(58) Field of Classification Search
CPC ......... G06F 8/65; H01R 13/665; H01R 24/60; H01R 29/00; H01R 43/02; H01R 2107/00
USPC ...................... 717/168; 455/559; 439/620.15
See application file for complete search history.

(56) References Cited

U.S. PATENT DOCUMENTS

| 6,934,561 | B2 * | 8/2005 | Burrus, IV | H01M 10/441 307/125 |
|---|---|---|---|---|
| 7,305,254 | B2 * | 12/2007 | Findikli | G06F 9/445 455/418 |
| 8,691,065 | B2 * | 4/2014 | Gau | G01N 27/286 204/406 |
| 2004/0063464 | A1 * | 4/2004 | Akram | H04W 52/0206 455/559 |
| 2008/0090615 | A1 * | 4/2008 | Lee | H01M 10/48 455/559 |
| 2009/0069050 | A1 * | 3/2009 | Jain | G06K 19/07739 455/558 |
| 2014/0087789 | A1 * | 3/2014 | Narendra | H04M 1/0274 455/558 |
| 2014/0213111 | A1 * | 7/2014 | Chang | H01R 13/514 439/620.15 |

(Continued)

FOREIGN PATENT DOCUMENTS

TW  M462978 U  10/2013
TW  M516242 U  1/2016

*Primary Examiner* — Ryan D. Coyer
(74) *Attorney, Agent, or Firm* — CKC & Partners Co., Ltd.

(57) ABSTRACT

A connector includes a metal connecting element, a solder pad, and a control chip. Multiple contacts are disposed on the metal connecting element, and the metal connecting element is configured to connect with an electronically marked cable. The solder pad is disposed on a surface of the metal connecting element. The control chip is affixed to the solder pad and configured to store data and process transmission of data and power via the electronically marked cable according the stored data. Multiple chip pins of the control chip are electrically connected with the contacts via the solder pad, and the control chip is configured to update the stored data upon receipt of a signal.

19 Claims, 4 Drawing Sheets

(56) References Cited

U.S. PATENT DOCUMENTS

2014/0227908 A1\* 8/2014 Satoh ................... H01R 13/516
                                                    439/620.15
2015/0212497 A1\* 7/2015 Dunstan .................... G06F 1/26
                                                    307/130

\* cited by examiner

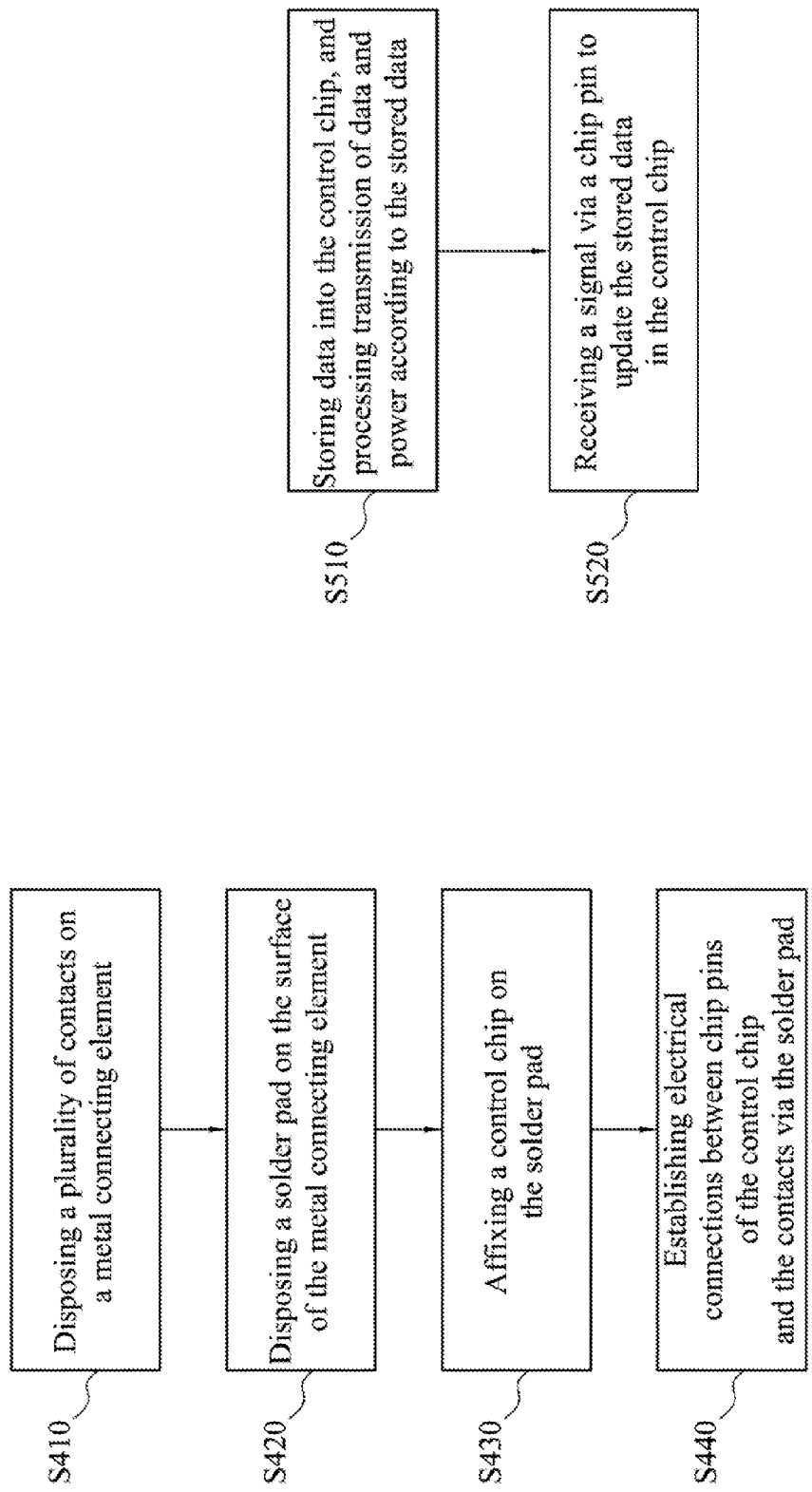

CONNECTOR AND MANUFACTURING METHOD AND UPDATING METHOD OF THE SAME

RELATED APPLICATIONS

This application claims priority to Taiwanese Application Serial Number 104121690, filed Jul. 3, 2015, which is herein incorporated by reference.

BACKGROUND

Field of Invention

The present disclosure relates to a connector and a manufacturing method and an updating method of the same. More particularly, the present disclosure relates to a connector used for an electronically marked cable and a manufacturing method and an updating method of the same.

Description of Related Art

With the rapid progress of electronic technology, universal serial buses have been widely used in a variety of electronic devices, such as personal computers, mobile devices, etc. With the continuous evolution of specifications of universal serial bus, from USB 1.0 to USB 2.0 to USB 3.0, types of connectors include a general USB connector, a Mini-USB connector, and a Micro-USB connector, etc. Functions of universal serial buses have become increasingly versatile. The universal serial buses can operate successfully, no matter data transmission or power supply, to greatly improve the convenience of electronic devices.

In order to support different specifications of power transmission and transmission rates, a control chip is disposed in the connector of a current USB cable that is responsible for communicating with devices connected with the USB cable and provides information including hardware specifications of the cable and the protocol supported by the USB cable. According to the prior art, a printed circuit board is disposed in the plastic housing of the connector, and the control chip is disposed on the printed circuit board. Therefore, the control chip is also encapsulated in the plastic housing. However, such an approach requires an additional cost for the printed circuit board. In addition to that, the control chip is not easily updated after being disposed on the printed circuit board. Only when the plastic housing is disassembled, the data or firmware stored in the control chip can be updated. Manpower and material resources are thus wasted to greatly increase the production cost and slow down the production schedule.

For the forgoing reasons, there is a need to decrease the production cost and accelerate the production flow by providing a connector and a manufacturing method and an updating method of the same.

SUMMARY

A connector is provided. The connector includes a metal connecting element, a solder pad, and a control chip. The metal connecting element is configured to connect with an electronically marked cable. A plurality of contacts are disposed on the metal connecting element. The solder pad is disposed on a surface of the metal connecting element. The control chip is affixed to the solder pad and configured to store data and process transmission of data and power via the electronically marked cable based on the stored data. A plurality of chip pins of the control chip are electrically connected with the contacts via the solder pad.

In one embodiment, the control chip is configured to receive a signal via at least one of the chip pins, and update the data stored in the control chip according to the signal.

In one embodiment, the control chip updates stored cable identification information according to the signal.

In one embodiment, the control chip updates a stored firmware file according to the signal.

In one embodiment, the metal connecting element is a universal serial bus (USB) Type-C connector.

In one embodiment, a first pin of the chip pins is electrically connected with a communication channel contact of the contacts, and the control chip receives the signal via the first pin to update the stored data.

In one embodiment, when transmission data included in the signal conforms to a custom format, the control chip updates a stored firmware file or stored cable identification information according to the signal, and the custom format is different from a format of a vendor-defined message (VDM) in the USB power transmission specification.

The present disclosure provides a manufacturing method of a connector. The manufacturing method includes the following steps: disposing a plurality of contacts in a metal connecting element, and the metal connecting element configured to connect with an electronically marked cable; disposing a solder pad on a surface of the metal connecting element; affixing a control chip to the solder pad; establishing electrical connections between a plurality of chip pins of the control chip and the contacts via the solder pad, and the control chip configured to store data and process transmission of data and power via the electronically marked cable according to the stored data.

In one embodiment, the manufacturing method further includes the following step: updating the stored data in the control chip according to a signal, and receiving the signal by the control chip via at least one of the chip pins.

In one embodiment, the step of establishing electrical connections via the solder pad includes: establishing an electrical connection between a first pin of the chip pins and a communication channel contact of the contacts, and receiving a signal by the control chip via the first pin to update the stored data.

The invention provides an updating method of a connector. The updating method includes the following steps: storing data in a control chip and processing transmission of data and power via an electronically marked cable according to the stored data; receiving a signal via at least one of a plurality of chip pins of the control chip, and updating the stored data in the control chip according to the signal. The electronically marked cable is connected with a metal connecting element. A plurality of contacts are disposed on the metal connecting element. A solder pad is disposed on a surface of the metal connecting element. The control chip is affixed to a surface of the solder pad. The plurality of chip pins are electrically connected with the contacts via the solder pad.

In one embodiment, the step of updating the stored data in the control chip according to the signal includes: updating stored cable identification information according to the signal.

In one embodiment, the step of updating the stored data in the control chip according to the signal includes: updating a stored firmware file according to the signal.

In one embodiment, the step of updating the stored data in the control chip according to the signal includes: receiving the signal via a first pin of the chip pins to update the stored data, the first pin being electrically connected with a communication channel contact of the contacts.

In one embodiment, the step of updating the stored data in the control chip according to the signal includes: updating a stored firmware fie or stored cable identification information according to the signal when transmission data included in the signal conforms to a custom format, and the custom format being different from a format of a vendor-defined message (VDM) in the USB power transmission specification.

In summary, the connector and the manufacturing method and the updating method of the connector provided by the present disclosure can greatly reduce the production cost, accelerate the production flow, and allow the firmware, the cable identification information or some other data stored in the control chip of the connector to be still easily updated after the production of the connecter with the electronically marked cable is completed, such that the production flow is thus more flexible. In addition, the control chip does not update the stored data until the transmission data in the received signal conforms to the custom format, so as to prevent the stored data in the control chip from being tampered. As a result, a misuse of the electronic cable or even the damage of the device caused by accidentally tampering with the data in the control chip with the electronic cable is avoided.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows:

FIG. 4 is a flow diagram illustrating a manufacturing method of a connector according to one embodiment of the present disclosure; and FIG. 5 is a flow diagram illustrating an updating method of a connector according to one embodiment of the present disclosure.

DESCRIPTION OF THE EMBODIMENTS

Figure 1:
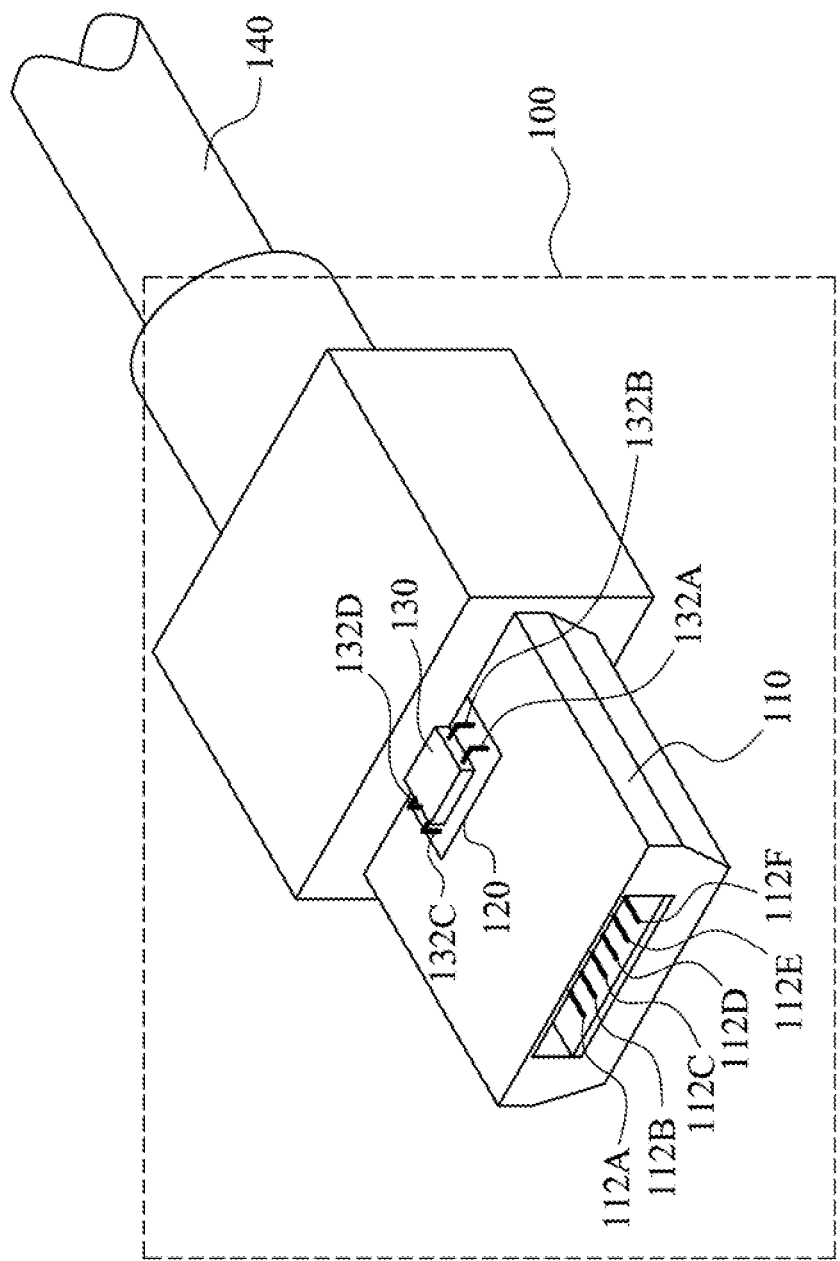
FIG. 1 is an external schematic diagram illustrating a connector according to one embodiment of the present disclosure.

Reference will now be made in detail to the present embodiments of the present disclosure, examples of which are illustrated in the accompanying drawings. Wherever possible, the same reference numbers are used in the drawings and the description to refer to the same or like parts. On the other hand, well-known elements and steps are not described in the embodiments to avoid unnecessary limitations to the present disclosure. In addition, drawings are only for the purpose of illustration and not plotted according to the original size.

As used herein, "connect" or "electrically connect" refers to direct physical contact or electrical contact or indirect physical contact or electrical contact between two or more elements. Or it can also refer to reciprocal operations or actions between two or more elements.

As used herein, "the first", "the second", . . . etc. do not refer to the order or priority, nor are they intended to limit the invention. They are merely used to distinguish the elements or operations described with the same technical terms.

It should be understood that the terms, "comprising", "having" and the like, used herein are open-ended, that is, including but not limited to.

It will be understood that, as used herein, the phrase "and/or" includes any and all combinations of one or more of the associated listed items.

Terms used herein typically have common meanings for each of the terms used in this field, in the present disclosure and in special contents, unless specially noted. Some terms for describing the present disclosure will be discussed in the following or elsewhere in this specification for providing practitioners with additional guidance related to the description of the present disclosure.

FIG. 1 is an external schematic diagram illustrating a connector 100 according to one embodiment of the present disclosure. The connector 100 includes a metal connecting element 110, a solder pad 120, and a control chip 130. The metal connecting element 110 is configured to connect with an electronically marked cable 140, and a plurality of contacts 112A-112F are disposed on the metal connecting element 110. When the electronically marked cable 140 is connected with a device (such as an electronic device including a computer or a smart TV) via the connector 100, the connector 100 is able to receive signals from the device via the contacts 112A-112F and transmit the signals via the electronically marked cable 140, or transmit signals from the electronically marked cable 140 to the device. The solder pad 120 is disposed on a surface of the metal connecting element 110. The control chip 130 is affixed to the solder pad 120. A plurality of chip pins 132A-132D included in the control chip 130 are electrically connected with the contacts 112A-112F via the solder pad 120. In the following specification, chip pins 132 are utilized to represent all of the chip pins 132A-132D collectively, and contacts 112 are utilized to represent all of the contacts 112A-112F collectively.

Figure 2:
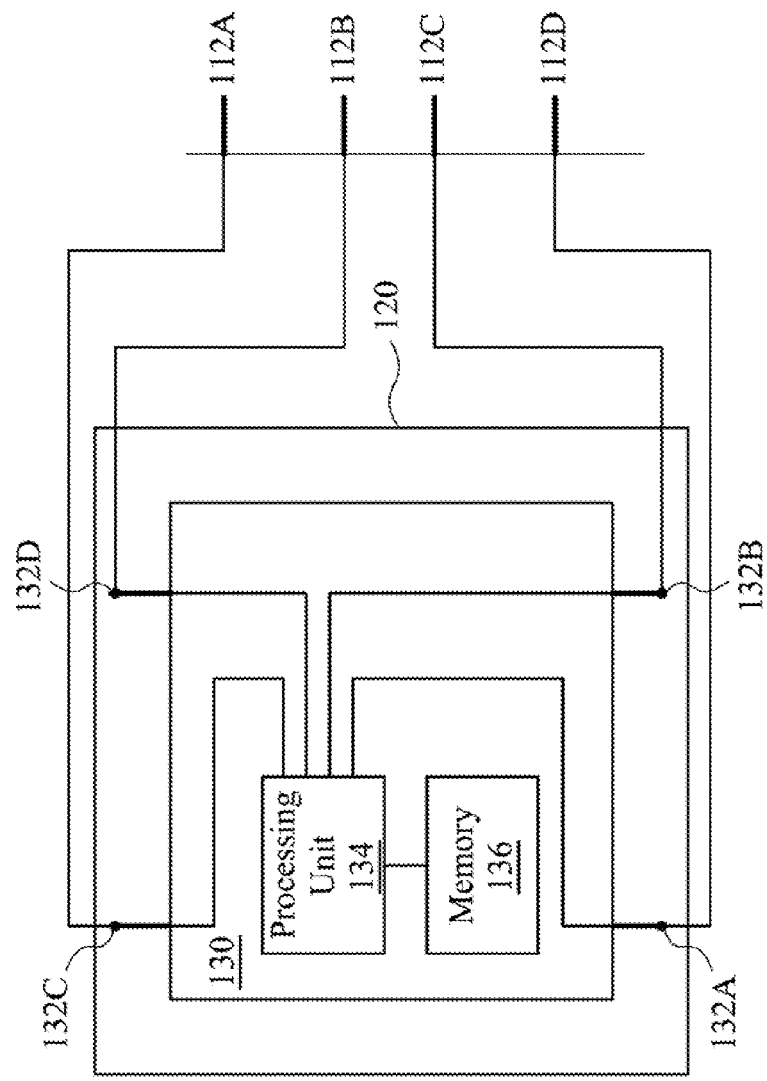
FIG. 2 is a functional blocks diagram illustrating a connector according to one embodiment of the present disclosure.

The control chip 130 is configured to store data and process transmission of data and power via the electronically marked cable 140 according to the stored data. A description is provided with reference to FIG. 2. The control chip 130 further includes a processing unit 134 and a memory 136 in FIG. 2. The data stored by the control chip 130 is stored in the memory 136. In some embodiments, the processing unit 134 is a microcontroller or a microprocessor in ARM architecture configured to perform operations and control the chip pins 132A-132D. The memory 136 includes a volatile memory and a non-volatile memory. The volatile memory includes any type of memory such as a static random access memory (SRAM) or a dynamic random access memory (DRAM) or combinations thereof. The non-volatile memory includes any type of memory such as a flash memory or an electrically erasable programmable read only memory (EEPROM) or combinations thereof. In FIG. 2, electrical connection between the chip pins 132A-132D and the contacts 112A-112D via the solder pad 120 is taken as an example.

It is noted that numbers of the contacts 112A-112F of the metal connecting element 110 and the chip pins 132A-132D of the control chip 130 and above-mentioned connection manner between them shown in FIG. 1 are for illustrative purposes only. Those of ordinary skill in the art may design the numbers of the contacts 112A-112F and the chip pins 132A-132D and the connection manner between them depending on practical application needs, and the present disclosure is not limited to the embodiments depicted.

In some embodiments, the solder pad 120 is disposed on the surface of the metal connecting element 110 by utilizing surface mount technology (SMT). The control chip 130 is also affixed to the solder pad 120 by utilizing the surface mount technology, and electrical connections between the chip pins 132A-132D and the contacts 112A-112D are established via bonding pads on the solder pad 120. The technology used for disposing the solder pad 120 on the surface of the metal connecting element 110 is not limited to the above example.

In the above connector 100, the solder pad 120 is disposed on the surface of the metal connecting element 110 and the control chip 130 is affixed to the solder pad 120, such that the chip pins 132A-132D of the control chip 130 are no longer encapsulated by a plastic housing of the connector 100. Hence, manufacturers have the flexibility of updating the data and the firmware stored in the control chip 130 of the connector 100 after the production of connector 100 is completed and before the connector 100 is delivered. As a result, the production cost and manufacturing time of the connector 100 are greatly decreased. The production schedule is more easily kept in line with market demands without wasting the production capacity. A further description for illustrating technical details for updating the stored data in the control chip 130 is provided as follows.

In one embodiment, the control chip 130 is configured to receive a signal via at least one of the chip fins 132, and update the stored data in the control chip 130 according to the signal. In some embodiments, the control chip 130 updates the stored cable identification information according to the signal. When the metal connecting element 110 conforms to the Universal Serial Bus (USB) specification, the cable identification information includes vendor identification (vendor ID), product identification (product ID), and information including a protocol and a device type being supported. When the metal connecting element 110 conforms to the IEEE1394 specification, the cable identification information includes the 64-bit extended unique identifier (EUI-64) and information including a protocol and a device type being supported. In other embodiments, the control chip 130 updates a stored firmware file according to the signal to ensure that the firmware file is the latest version or capable of supporting particular functions demanded by customers.

It is noted that the so-called vendor identification is developed by the USB implementer forum (USB-IF). A vendor is able to identify a vendor-defined instruction defined by itself based on the vendor identification. Different vendors may have different vendor identifications. In the above, updating information by the control chip 130 according to the signal is taken as an example, however, the present disclosure is not limited in this regard.

In one embodiment, the metal connecting element 110 is a USB Type-C connector. In another embodiment, the metal connecting element 110 is a USB Type-A connector. In other embodiments, the metal connecting element 110 is the other type of USB connector, such as a USB Mini-A connector or a USB Micro-B connector. In still other embodiments, the metal connecting element 110 is, for example, a FireWire connector conforming to the IEEE 1394 specification. Those of ordinary skill in the art may apply the teaching of the present disclosure to connectors that connect with some other types of transmission cables without limited to the examples.

In one embodiment, when the metal connecting element 110 is a USB Type-C connector, a first pin of the chip pins 132 is electrically connected with a communication channel contact of the contacts 112, and the control chip 130 receives a signal via the first pin to update the stored data. According to the USB 3.1 standard, the communication channel contact of the contacts 112 included in the Type-C connector is configured to perform customized communications in a non-data transmission mode without affecting general operations of the universal serial bus.

In one embodiment, when the metal connecting element 110 is a USB Type-C connector, the control chip 130 determines that one of the chip pins 132 receives a signal. When transmission data included in the signal conforms to a custom format, the control chip 130 updates the stored firmware file or the stored cable identification information according to the signal. Since the firmware file significantly affects normal operations of the control chip 130, the custom format is different from a format of a vendor-defined message (VDM) in the USB-PD protocol to avoid an accidental or deliberate damage of the firmware file that causes failure of the electronically marked cable 140 connected with the connector 100 or the control chip 130 in the connector 100, or even causes failure of the device connected with the connector 100.

Figure 3A:
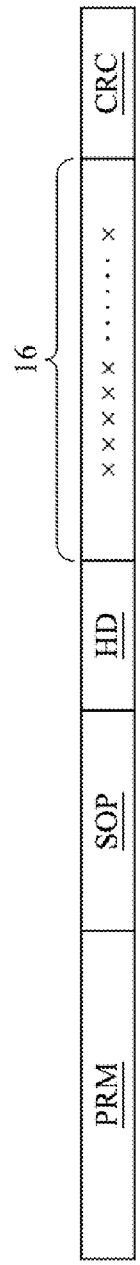
FIG. 3A to FIG. 3C is schematic diagrams illustrating formats of transmission data according to one embodiment of the present disclosure.
Figure 3B:
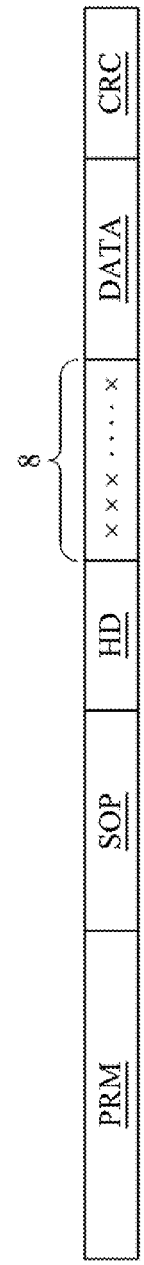
Figure 3C:

FIG. 3A to FIG. 3C is schematic diagrams illustrating formats of transmission data according to one embodiment of the present disclosure. According to the present embodiment, the control chip 130 receives the signal and the transmission data included in the signal conforms to the custom format. The control chip 130 first receives a first packet. FIG. 3A depicts a format of the first packet that has a preamble field PRM, a start of packet (SOP) field SP, and a packet data field. The packet data field includes a header field HD and a cyclic redundancy code field CRC. In the custom format, 16 bits with the same binary values (0 or 1) are included between the header field HD and the cyclic redundancy code field CRC of the first packet, and two's complement of the cyclic redundancy code calculated by a general cyclic redundancy algorithm is filled into the cyclic redundancy code field CRC. That is, an exclusion or XOR operation is performed on the cyclic redundancy code calculated by the general cyclic redundancy algorithm with data "1 . . . 1" having the same bit length, such that a general transmission packet is not mistaken for a packet for updating the firmware file or the cable identification information so as to avoid incorrect data from being written into the control chip 130.

FIG. 3B depicts a second packet included in the signal received by the control chip 130. The difference between the second packet and the first packet is bit data between the header field HD and the cyclic redundancy code field CRC. The second packet includes 8 bits having the same binary values (0 or 1) and is followed by data field DATA of the firmware file or the cable identification information intended to be written in. Since a length of a USB packet is limited (8, 16, 32, or 64 bytes), the control chip 130 will receive data transmitted by the signal continuously when the second packet is not able to transmit the complete firmware file or the cable identification information. A format of the data is shown as a third packet in FIG. 3C. The third packet also includes the preamble field PRM, the start of packet field SP, the header field HD, and the cyclic redundancy code field CRC. A data field DATA is included between the header field HD and the cyclic redundancy code field CRC, which includes a data segment of the firmware file or the cable identification information intended to be transmitted. The control chip 130 continuously receives the packet conforming to a format of the third packet until the firmware file or the cable identification information is completely transmitted, and then updates the data stored by the control chip 130.

It is noted that, according to the above embodiment, the two's complement filled into the cyclic redundancy code field CRC is different from the prior art cyclic redundancy code, so as to prevent from accidentally or deliberately writing in the incorrect firmware file or cable identification information by a third party, such as a user or a person other than the manufacturer, and further prevent from functional failure of the connector 100 and the electronically marked cable 140 connected with the connector 100 attributable to the accidental or deliberate writing. In addition, the above-mentioned custom format is also different from the format of the vendor-defined message (VDM) in the USB power transmission specification to further prevent from writing the incorrect firmware file or the cable identification information into the control chip 130.

The packet formats shown above in FIG. 3A to FIG. 3C are only one embodiment of this disclosure for illustrating the technical concept that the control chip 130 determines the information transmitted in the signal must conform to the custom format before the update can be performed when the control chip 130 updates the stored firmware file or cable identification information according to the received signal, and are not intended to limit the present disclosure. For example, for the cyclic redundancy code field CRC of the packet, apart from using the two's complement of the cyclic redundancy code calculated by a general cyclic redundancy algorithm, another method is shifting the cyclic redundancy code calculated by a general cyclic redundancy algorithm to the left or right by a predetermined length, and filling the obtained result into the cyclic redundancy code field CRC of the packet. Those of ordinary skill in the art, after reading the teaching of the present disclosure, may perform modifications and variations to achieve the same technical effect without departing from the spirit and scope of the present disclosure.

FIG. 4 is a flow diagram illustrating a manufacturing method 400 of a connector according to one embodiment of the present disclosure. It should be understood that although the manufacturing method 400 of the connector in the flow diagram is described by steps in a specific order, the order of steps described in the present invention is not limited. In practices, a step may be added in the steps of the manufacturing method 400, or one of the steps of the manufacturing method 400 can be omitted. In addition to that, to simplify and clarify matters, the manufacturing method 400 of the connector used for manufacturing the connector 100 shown in FIG. 1 is taken as an example for illustration, but the present disclosure is not limited in this regard.

In the flow of the manufacturing method 400 of the connector, the plurality of contacts 112 are disposed in the metal connecting element 110, and the metal connecting element 110 is configured to connect with the electronically marked cable 140 (step S410). The contacts 112 of the metal connecting element 110 are configured to connect with a device, such that the device is able to process transmission of data or power via the electronically marked cable 140. Since details in this regard have been described above, a description is not provided.

Then, the solder pad 120 is disposed on the surface of the metal connecting element 110 (step S420). The control chip 130 is further affixed to the solder pad 120 (step S430). In one embodiment, the surface mount technology (SMT) is utilized to dispose the solder pad 120 on the surface of the metal connecting element 110 and affix the control chip 130 to the solder pad 120. Since technical details in this regard have been described above, a description is not provided.

In the manufacturing method 400 of the connector, electrical connections between the chip pins 132 of the control chip 130 and the contacts 112 are established via the solder pad 112 (step S440). The manufacturer establishes the electrical connections between the chip pins 132 of the control chip 130 and the contacts 112, such that a user only needs to connect the connector 100 with a port of other electronic device, such as the user's computer or a host while using the electronically marked cable 140, and the chip pins 132 of the control chip 130 can thus receive or transmit a signal to process transmission of data or power. The control chip 130 processes transmission of data and power via the electronically marked cable 140 according to the stored data.

In addition, through the solder pad 120, the manufacturer of the connector 100 directly disposes the control chip 130 on the surface of the metal connecting element 110 to save the cost for the printed circuit board (PCB) required by the prior art connector so as to achieve a higher economic benefit.

In one embodiment, the control chip 130 updates the stored data in the control chip 130 according to the signal, and the control chip 130 receives the signal via at least one of the chip pins 132. Since in the manufacturing method 400 of the connector the control chip 130 is disposed outside the metal connecting element 110 by using the solder pad 120, it is convenient for the manufacturer to update the stored data in the control chip 130 through the chip pins 132 of the exposed control chip 130. As a result, the manufacturer can control the production flow more flexibly to greatly decrease the production cost and manufacturing time.

In one embodiment, when the metal connecting element 110 is a USB Type-C connector, in the manufacturing method 400 of the connector, an electrical connection between a first pin of the chip pines 132 and a communication channel contact of the contacts 112 is established. The control chip 130 receives the signal via the first pin to update the stored data. Since details for adopting the communication channel contact and establishing the electrical connection have been described above, a description in this regard is not provided.

FIG. 5 is a flowchart illustrating an updating method 500 of a connector according to one embodiment of the present disclosure. It should be understood that although the updating method 500 of the connector in the flowchart is described by steps in a specific order, the order of steps described in the present invention is not limited. In practices, a step may be added in the steps of the present disclosure or one of the steps of the present disclosure can be omitted. In addition to that, to simplify and clarify matters, the updating method 500 of the connector used for updating the connector 100 shown in FIG. 1 is taken as an example for illustration, but the present disclosure is not limited in this regard.

In the flow of the updating method 500 of the connector, the control chip 130 stores data and processes transmission of data and power via the electronically marked cable 140 according to the stored data (step S510). The electronically marked cable 140 is connected with the metal connecting element 110. The plurality of contacts 112 are disposed on the metal connecting element 110. The solder pad 120 is disposed on a surface of the metal connecting element 110. The control chip 130 is affixed to a surface of the solder pad 120. The chip pins 132 are electrically connected with the contacts 112 via the solder pad 120. Hence, the control chip 130 receives a signal transmitted to the contacts 112 through electrical connections with the contacts 112 to process transmission of data and power via the electronically marked cable 140.

Then, the control chip 130 receives the signal via at least one of the chip pins 132 of the control chip 130, and updates the stored data in the control chip 130 according to the signal (step S520). In one embodiment, the control chip 130 updates the cable identification information stored in the control chip 130 according to the signal. Since details of the cable identification information have been described above, a description in this regard is not provided. In another embodiment, the control chip 130 updates a firmware file stored in the control chip 130 according to the signal to support the latest version of data transmission or power transmission function, or updates the firmware file to a customized firmware file so as to support particular functions. Since details in this regard have been described above, a description is not provided.

In still another embodiment, the updating method 500 of the connector is applied to the metal connecting element 110 conforming to the USB Type-C connector specification. In step S520, the control chip 130 receives the signal via a first pin of the chip pins 132 to update the stored data. The first pin is electrically connected with a communication channel contact of the contacts 112. Since details for adopting the communication channel contact and establishing the electrical connection have been described above, a description in this regard is not provided.

In yet another embodiment, the updating method 500 of the connector is applied to the metal connecting element 110 conforming to the USB Type-C connector specification. In step S520, the control chip 130 updates a stored firmware file or stored cable identification information according to the signal when transmission data comprised in the signal conforms to a custom format. In order to prevent an user or a third party from changing the firmware file to cause failure of the control chip 130, or changing the cable identification information to cause damage of the electronically marked cable 140 because of the received signal not conforming to the specification, the custom format is different from a format of a vendor-defined message (VDM) in the USB power transmission specification. Since details for realizing the step have been described above, a description in this regard is not provided.

In summary, the connector and the manufacturing method and the updating method of the connector provided by the present disclosure can greatly reduce the production cost, accelerate the production flow, and enable the firmware, the cable identification information or some other data stored in the control chip of the connector to be still easily updated after the production of the connecter connecting with the electronically marked cable is completed. Planning of the production flow is thus more flexible to maximize production capacity utilization. In addition, the control chip only updates the stored data when transmission data in the received signal conforms to the custom format and does not conform to the format of the vendor-defined message (VDM). As a result, a misuse caused by tampering with the data in the control chip that connects with the electronically marked cable can be prevented to further avoid the damage of the electronically marked cable or the device connected with the electronically marked cable.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A connector comprising:
    a metal connecting element configured to connect with an electronically marked cable, and comprising a plurality of contacts configured to directly connect with an electronic device, wherein the electronically marked cable is connected with an electronic device via the metal connecting element;
    a solder pad disposed on a surface of a structure of the metal connecting element; and
    a control chip directly affixed to the solder pad to dispose on structure of the metal connecting element, and configured to store data and process transmission of data and power via the electronically marked cable according to the stored data, a plurality of chip pins of the control chip being electrically connected with the contacts via the solder pad directly.

2. The connector of claim 1, wherein the control chip is configured to receive a signal via at least one of the chip pins, and update the stored data in the control chip according to the signal.

3. The connector of claim 2, wherein the control chip updates stored cable identification information according to the signal.

4. The connector of claim 2, wherein the control chip updates a stored firmware file according to the signal.

5. The connector of claim 2, wherein the metal connecting element is a universal serial bus (USB) Type-C connector.

6. The connector of claim 5, wherein a first pin of the chip pins is electrically connected with a communication channel contact of the contacts, and the control chip receives the signal via the first pin to update the stored data.

7. A manufacturing method of a connector comprising:
    disposing a plurality of contacts in a metal connecting element, the metal connecting element being configured to connect with an electronically marked cable, wherein the electronically marked cable is connected with an electronic device via the metal connecting element;
    disposing a solder pad on a surface of a structure of the metal connecting element;
    directly affixing a control chip on the structure of the metal connecting element through the solder pad; and
    establishing electrical connections between a plurality of chip pins of the control chip and the contacts via the solder pad, the control chip being configured to store data and process transmission of data and power via the electronically marked cable according to the stored data.

8. The manufacturing method of the connector of claim 7, further comprising:
    updating the stored data in the control chip according to a signal, the control chip being configured to receive the signal via at least one of the chip pins.

9. The manufacturing method of the connector of claim 7, wherein the metal connecting element is a universal serial bus (USB) Type-C connector.

10. The manufacturing method of the connector of claim 9, wherein the step of establishing the electrical connections via the solder pad comprises:
establishing an electrical connection between a first pin of the chip pins and a communication channel contact of the contacts, to enable the control chip to receive a signal via the first pin to update the stored data.

11. An updating method of a connector comprising:
storing data in a control chip and processing transmission of data and power via an electronically marked cable according to the stored data; and
receiving a signal via at least one of a plurality of chip pins of the control chip, and updating the stored data in the control chip according to the signal;
wherein the electronically marked cable is connected with a metal connecting element, a plurality of contacts are disposed on the metal connecting element, the electronically marked cable is connected with an electronic device via the metal connecting element, a solder pad is disposed on a surface of a structure of the metal connecting element, the control chip is directly affixed to a surface of the solder pad to dispose on structure of the metal connecting element, the plurality of chip pins are electrically connected with the contacts via the solder pad directly.

12. The updating method of the connector of claim 11, wherein the step of updating the stored data in the control chip according to the signal comprises:
updating stored cable identification information according to the signal.

13. The updating method of the connector of claim 11, wherein the step of updating the stored data in the control chip according to the signal comprises:
updating a stored firmware file according to the signal.

14. The updating method of the connector of claim 11, wherein the metal connecting element is a universal serial bus (USB) Type-C connector.

15. The updating method of the connector of claim 14, wherein the step of updating the stored data in the control chip according to the signal comprises:
receiving the signal via a first pin of the chip pins to update the stored data, the first pin being electrically connected with a communication channel contact of the contacts.

16. The connector of claim 1, wherein the surface is an outer surface of the metal connecting element, and the solder pad is disposed on the outer surface and is exposed out the metal connecting element.

17. The manufacturing method of the connector of claim 7, wherein the surface is an outer surface of the metal connecting element, and the method further comprising to dispose the solder pad on the outer surface of the metal connecting element to expose out the metal connecting element.

18. The updating method of the connector of claim 11, wherein the surface is an outer surface of the metal connecting element, and the solder pad is disposed on the outer surface and exposed out the metal connecting element.

19. The connector of claim 1, wherein the plurality of chip pins of the control chip being electrically connected with the contacts via the solder pad without any circuit print board.

* * * * *